(12) United States Patent
Motrenko et al.

(10) Patent No.: US 8,862,762 B1
(45) Date of Patent: Oct. 14, 2014

(54) REAL-TIME CONSUMPTION OF A LIVE VIDEO STREAM TRANSMITTED FROM A MOBILE DEVICE

(75) Inventors: Alex Motrenko, Moscow (RU); Andrey Smirnov, Moscow (RU); Artem Chernyshev, Moscow (RU)

(73) Assignee: Skype, Dublin (IE)

( * ) Notice: Subject to any disclaimer, the term of this patent is extended or adjusted under 35 U.S.C. 154(b) by 178 days.

(21) Appl. No.: 12/896,728

(22) Filed: Oct. 1, 2010

Related U.S. Application Data (60) Provisional application No. 61/247,897, filed on Oct. 1, 2009.

(51) Int. Cl.
*G06F 15/16* (2006.01)

(52) U.S. Cl.
USPC .......................................... 709/231; 709/230

(58) Field of Classification Search
USPC .................................. 709/230, 231
See application file for complete search history.

(56) References Cited

U.S. PATENT DOCUMENTS

| | | | |
|---|---|---|---|
| 5,768,527 A | 6/1998 | Zhu et al. | |
| 7,342,880 B2 | 3/2008 | Yanagihara et al. | |
| 2002/0190876 A1 | 12/2002 | Lai et al. | |
| 2003/0058931 A1 | 3/2003 | Zhang et al. | |
| 2003/0118107 A1 | 6/2003 | Itakura et al. | |
| 2004/0008253 A1* | 1/2004 | Monroe | 348/143 |
| 2006/0005101 A1 | 1/2006 | Li et al. | |
| 2007/0088603 A1* | 4/2007 | Jouppi et al. | 705/14 |
| 2007/0143493 A1* | 6/2007 | Mullig et al. | 709/232 |
| 2008/0101476 A1 | 5/2008 | Tian et al. | |
| 2008/0195664 A1* | 8/2008 | Maharajh et al. | 707/104.1 |

OTHER PUBLICATIONS

"Non-Final Office Action", U.S. Appl. No. 12/276,171, filed Aug. 15, 2012, 22 pages.
"Restriction Requirement", U.S. Appl. No. 12/276,171, filed Jun. 7, 2012, 6 pages.
Lankow, G "Implementation of a Real-Time Multimedia Streaming Protocol over Network", (2004), 31 pages.
Wu, Dapeng et al., "Streaming Video over the Internet: Approaches and Directions", *IEEE Transactions on Circuits and Systems for Video Technology*, vol. 11, No. 3, Available at <http://citeseerx.ist.psu.edu/viewdoc/download?doi=10.1.1.70.7880&rep=rep1&type=pdf>,(Mar. 2001), pp. 282-300.
"Final Office Action", U.S. Appl. No. 12/276,171, filed Dec. 18, 2012, 16 pages.
"Non-Final Office Action", U.S. Appl. No. 12/276,171, filed Feb. 14, 2014, 17 pages.

* cited by examiner

*Primary Examiner* — Wing F Chan
*Assistant Examiner* — Andrew Woo
(74) *Attorney, Agent, or Firm* — Sonia Cooper; Jim Ross; Micky Minhas (57) ABSTRACT

Techniques are provided for transmitting a live video stream from a mobile device for live viewing by one or more consuming devices. An intermediate server receives the live video stream from the mobile device, identifies a plurality of consuming devices, and sends a real-time notification to those consuming devices to inform the users of those devices that a live video stream is available for immediate viewing. Also, any necessary processing (e.g., transcoding) is performed on the live video stream before the live video stream is sent to one or more consuming devices. The "producing" mobile device is not required to identify (or have any data about) any of the consuming devices in order for the live video stream to be transmitted to those devices. The consuming device can be on a mobile network, any Web network, or any PC connected to the Internet.

20 Claims, 8 Drawing Sheets

REAL-TIME CONSUMPTION OF A LIVE VIDEO STREAM TRANSMITTED FROM A MOBILE DEVICE

CLAIM OF PRIORITY

This application is related to and claims the benefit of priority from U.S. Provisional Application No. 61/247,897 filed on Oct. 1, 2009, entitled "Scalable, Immediate (Live) Consumption of Live Streaming Videos Transmitted From Mobile Phones," the entire contents of which is incorporated by this reference for all purposes as if fully disclosed herein.

This application is also related to U.S. patent application Ser. No. 12/276,171 filed on Nov. 21, 2008, entitled "HIGH QUALITY MULTIMEDIA TRANSMISSION FROM A MOBILE DEVICE FOR LIVE AND ON-DEMAND VIEWING," the entire contents of which are incorporated by this reference for all purposes as if fully disclosed herein.

FIELD OF THE INVENTION

The present invention relates to real-time notification to potential consuming devices of live video streams transmitted from mobile devices.

BACKGROUND

There are a number of IP-based mobile devices that are able to (1) capture and locally record on the device pictures and multimedia content (defined as video and audio) and (2) transmit data from the device to another IP-based device or server accessible via (or simply "on") the Internet. Examples of such devices include camera phones, tablet computers, and cameras (e.g. camcorders) with an IP endpoint.

Current methods for distributing video content from mobile devices include uploading the video content to a central server, creating a link that identifies the location of the video content, and sending an email or text message that contains the link to one or more friends. A recipient of such a message selects the link, which may allow the recipient to (a) first download the video content and then play the downloaded content or (b) cause a media player to begin playing the video content as the video content is streamed to the recipient's device. This process is referred to herein as the "upload and share" paradigm. The upload and share paradigm thus requires the user that initiated the generation of the video content to perform multiple steps and for the recipient to actively retrieve the video content. Also, there is significant lag time between capture of the video and eventual consumption (or viewing) of the video. Thus, this paradigm is not considered real-time. What is needed is a more efficient and real-time way to distribute video and/or audio content captured at a mobile device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided herein for live streaming of video transmitted from a mobile device (or "producing device") to one or more endpoint devices (or "consuming devices") for viewing. The producing device is not required to identify, or even have prior knowledge about, the one or more consuming devices. Also, the live video stream is not required to include any data about the consuming devices. This paradigm is referred to herein as "live stream pushing." The relevance of a video stream is pre-established by the producing device and one or more consuming devices establishing a virtual relationship between the producing device and consuming device, or by a deliberate act of the producing device choosing a recipient for the video stream.

The live video stream is processed by an intermediary server to generate a live video stream that is appropriate and compatible with the consuming device that receives the live video stream. The intermediary server notifies, in real-time, a plurality of potential consuming devices about the video stream. If a user operating a potential consuming device instructs his/her device to accept the live video stream, then the intermediate server sends the live video stream to the consuming device.

A real-time or "live" transmission of a video stream from a mobile device refers to the sending of data near or at the same time that the data is captured. Thus, a live transmission of a video stream is associated with low latency, e.g., less than one second between the capturing of the data on a mobile device to the transmission of the video stream from the mobile device. Additionally, latency or delay may be caused by any intermediate devices, such as any servers that further process the data or network devices that forward the data through a network. Further, the nature of the network (e.g., 3G, 4G, WiFi, broadband, etc.) may introduce delays. In order to be considered a "live" transmission, the video stream must be transmitted from a mobile device without exceeding a predefined latency threshold (e.g., 0.5 seconds between capture and transmission from a mobile device to the receiving devices). Mobile network connections to the intermediate server for both producing device and consuming device will also have an impact on the "live" nature of the video stream by potentially introducing a delay making instantaneous consumption impossible at times.

Live Stream Pushing Vs. Other Video Sharing Paradigms

The live stream pushing paradigm can be contrasted from other video sharing paradigms, such as T.V., video calling, and "upload and share." In the T.V. paradigm, television signals are either (a) instantly consumed (i.e., displayed at an endpoint) or (b) recorded by specifically identifying a channel, date, and time of the television signal to-be-broadcasted. Thus, a user must tune in to a specific channel to see what is being broadcasted on that channel. If a user has missed the news, for example, then there is no easy way of going back to the missed news and viewing the missed news at a later time. In the live stream pushing paradigm, on the other hand, a user operating a consuming device (e.g., a mobile phone, PC, or T.V.) will have the videos specifically shared with the user or that the user has subscribed to receive will be available and easily identifiable and accessible to the consuming device. Thus, because a consuming user may elect to view the video stream at a later time, the live stream pushing paradigm may also be thought of as a DVR (or digital video recorder) in a cloud.

In the calling paradigm, the caller must explicitly identify the receiver. In contrast, in the live stream pushing paradigm, the producing device is not required to (but still may) identify any of the potential consuming devices.

In the upload and share paradigm, a user of a producing device must performed multiple actions in order to upload his/her video/audio and notify others that the video/audio is available for consumption. However, in the live stream pushing paradigm, only a single click by a producing device may be required in order to produce a live video stream and cause the video stream to be delivered, live or archived, to one or more consuming devices.

The live stream pushing paradigm has a social aspect in that, previous to any live stream production, connections between users (e.g., family and friends) may be established. These connections allow each interested user to be notified in real-time of others' live or past (archived) streams. Existence of such pre-set social connections sets the live stream pushing paradigm apart from the TV and upload and share paradigms, by creating a circle of relevant consuming devices for the videos produced this way. The set of software and hardware components that are required to implement the live stream pushing paradigm (as disclosed herein) allows this type of sharing to be easy, meaningful, and a normal part of life for users, who may not consider themselves video bloggers. The live stream pushing paradigm thus allows non-tech savvy users to be "micro" video bloggers within their circle of friends, in that only their circle of friends will be notified and able to view captured video rather than being required to share their video with the world.

Architecture Overview

Figure 1:
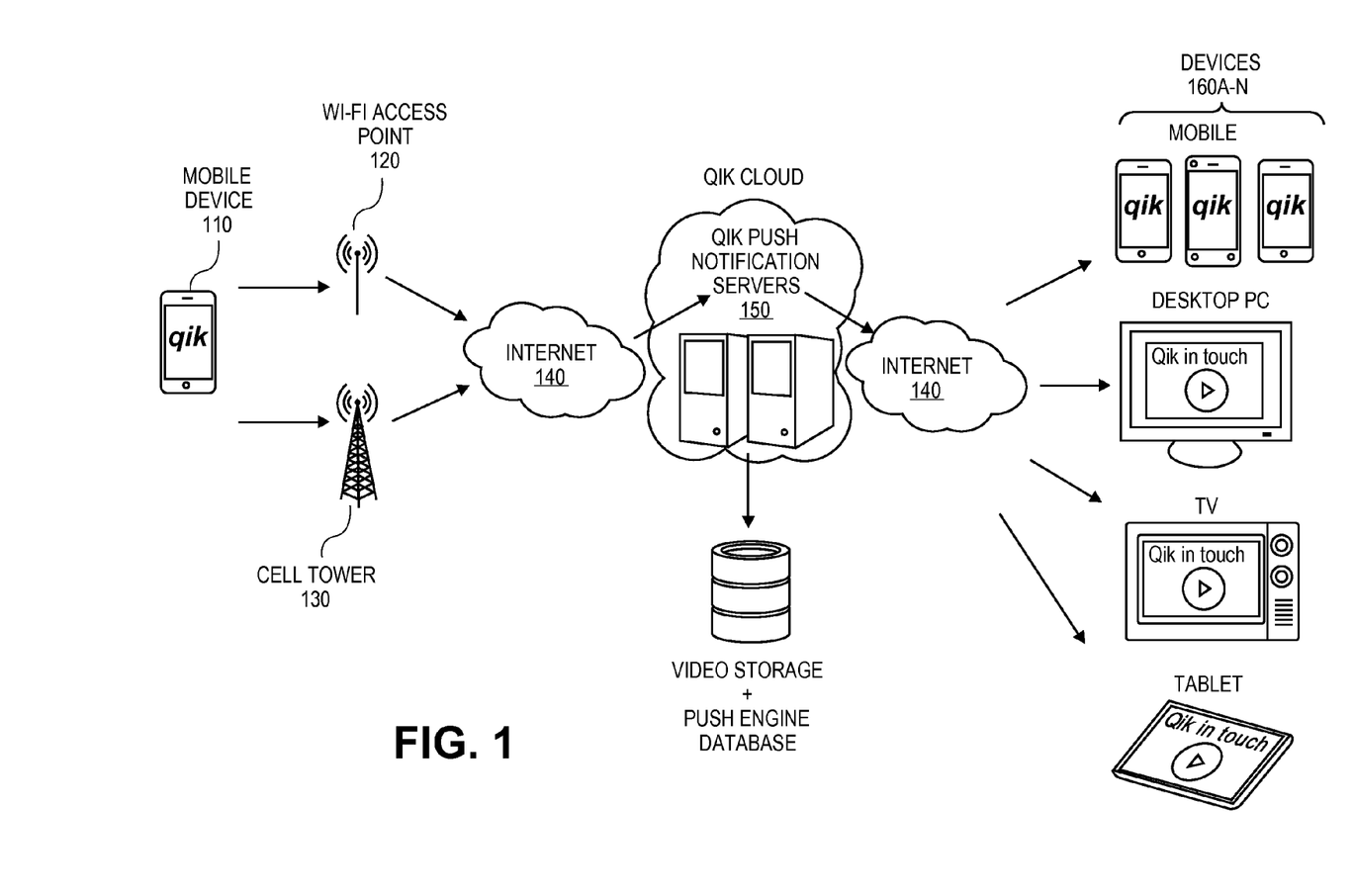
FIG. 1 is a block diagram that depicts an example system architecture, according to an embodiment of the invention.

FIG. 1 is a block diagram that depicts an example system architecture 100, according to an embodiment of the invention. System architecture 100 comprises a mobile device 110, a Wi-Fi access point 120, a cell tower 130, the Internet 140, Push Notification Server 150, and devices 160A-N. Some of devices 160A-N may execute software that enables devices 160A-N to receive real-time video notifications from Push Notification Server 150 and receive a live video stream (i.e., in real-time) from another intermediary associated with Push Notification Server 150. An example of such software is Quk-in-Touch™. System architecture 100, particularly Push Notification Server 150, allows for different types of live media sharing: mobile-to-mobile, mobile-to-Web, mobile-to-desktop, and mobile-to-TV.

Mobile device 110 captures images and generates a video stream from the captured images. Mobile device 110 executes a software application that establishes a communication channel with Push Notification Server 150 in order to send the live video stream (and an indication thereof) to Push Notification Server 150. The application causes metadata about the video stream (e.g., information about the user of mobile device 110, information about mobile device 110, a title and/or tag for the video stream, location of mobile device 110, privacy information) to be sent along with the live video stream. Non-limiting examples of mobile device 110 include a phone, personal digital assistant (PDA), a laptop computer, or other mobile device that includes a video and/or audio recorder. Non-limiting examples of makers of mobile phones with cameras include Blackberry, HTC, Apple, Google, Motorola, Nokia, LG, Palm, Cisco Flip, and Samsung. Mobile device 110 may be any device with a camera and an IP endpoint.

Video and audio streams from mobile device 110 are processed, stored, transcoded, and prepared for live consumption by software and hardware components (not shown) associated with Push Notification Server 150. Metadata about a live video stream from mobile device 110 is also processed and stored in a database. Metadata about a live video stream may be updated continuously, such as the duration of a live video stream, the loss of a connection, a video view counter that indicates how many times the video stream has been displayed and/or how many consuming devices have displayed the video stream, any comments/chat messages associated with the live video stream.

The user that operates mobile device 110 is referred to herein as the "producing user." As indicated above, mobile device 110 may be referred to as a "producing device."

Mobile device 110 is communicatively coupled to Push Notification Server 150 via Wi-Fi access point 120 or cell tower 130 and Internet 140. Similarly, devices 160A-N are communicatively coupled to Push Notification Server 150 via Internet 140 and, optionally, a Wi-Fi access point or a cell tower.

Push Notification Server 150 receives an indication of a live video stream that is being transmitted (or is about to be transmitted) from mobile device 110. Push Notification Server 150 sends real-time notifications of the live video stream to devices 160A-N, whose users have previously subscribed for the notification. Components of Push Notification Server 150 (described in more detail in relation to FIG. 4) listen for changes in database tables and stores those changes for fast retrieval.

Devices 160A-N are any devices that are configured to receive a real-time notification of live video stream from Push Notification Server 150. As depicted in FIG. 1, non-limiting examples of devices 160A-N include a mobile phone, a personal computer (PC), a TV, and a tablet computer, each executing software that enables the device to receive real-time video notifications from Push Notification Server 150.

Additionally or alternatively, devices 160A-N may receive a SMS message that notifies the users of devices 160A-N that a live video stream is available. The users then have to use a web browser application or start-up software that enables the users to view the live video stream at their respective devices.

The users that operate devices 160A-N are referred to as "consuming users" (or at least "potential consuming users") while devices 160A-N are referred to herein as "consuming devices" (or at least "potential consuming devices"). Any communication protocol that is necessary to transmit the live stream from Push Notification Server 150 to devices 160A-N may be used.

If a consuming device is a PC, such as a laptop or desktop computer, then the live video stream may be transcoded to a Flash format (e.g., Flash file formats FLV or F4V) and then delivered to the PC. If a consuming device is a television system, then the live video stream may be transcoded to a MPEG2 format and then delivered to the television system. If a consuming device is a mobile phone, then the live video stream may be transcoded into a format that is supported by the mobile phone and then delivered to the mobile phone.

A real-time video notification of a live video stream may be sent to devices 160A-N prior to any portion of the live video stream being sent to devices 160A-N. Alternatively, the live video stream and the real-time video notification are sent contemporaneously to devices 160A-N. In this case, devices 160A-N may display the notification and at least a portion of the live video stream simultaneously. The real-time video notification provides an opportunity for each consuming user to immediately view the live video stream, to ignore the live video stream, or to indicate that the consuming user would like to view the live video stream later (i.e., on-demand rather than live).

A real-time video notification may indicate any type of information about the producing user and/or the live video stream. For example, a real-time video notification may indicate a name of the producing user, the geographic location of the producing device, and/or any data indicated by the producing device user, such as a level of importance of the live stream, a tag, or a name given to the live video stream. Additionally, a real-time video notification may include a frame of video from the live video stream. Additionally or alternatively, the live video stream may be automatically sent to one or more consuming devices without any input received from the one or more consuming users.

A potential consuming device connects to Push Notification Server 150 and specifies video streams that are interesting to the potential consuming user of the potential consuming device. For example, a potential consuming device may provide subscription data that indicates interest in all new live video streams, videos produced by a particular user, video streams that are produced by followers of the potential consuming user, streams whose corresponding title/description includes a particular word or phrase, streams that are associated with a particular tag, streams that are produced in certain locations or regions, and/or streams that are produced during a particular time period. Subscription data is stored in a push engine database (described in more detail below).

When a new live video stream is being transmitted from a mobile device or one or more properties of a current live video stream are changed, these changes are pushed as notifications to consuming devices immediately (i.e., in real-time). Consuming devices may immediately begin showing the live video stream (as in FIG. 2) coming from a media server (not shown).

One or more of devices 160A-N might execute an application (e.g., a web browser application or an instant messaging client) that is communicatively coupled to a particular service application. The service application may be part of, for example, a social networking service or an instant messaging (IM) service. Thus, for example, if a user of a device is currently logged into a social networking service, then Push Notification Server 150 sends a live video stream notification to the social networking service using the appropriate identity of the user of the device. The social networking service then uses the social networking identity of the user to send the live stream notification to the user's device.

Example Mobile-to-Desktop

Figure 2:
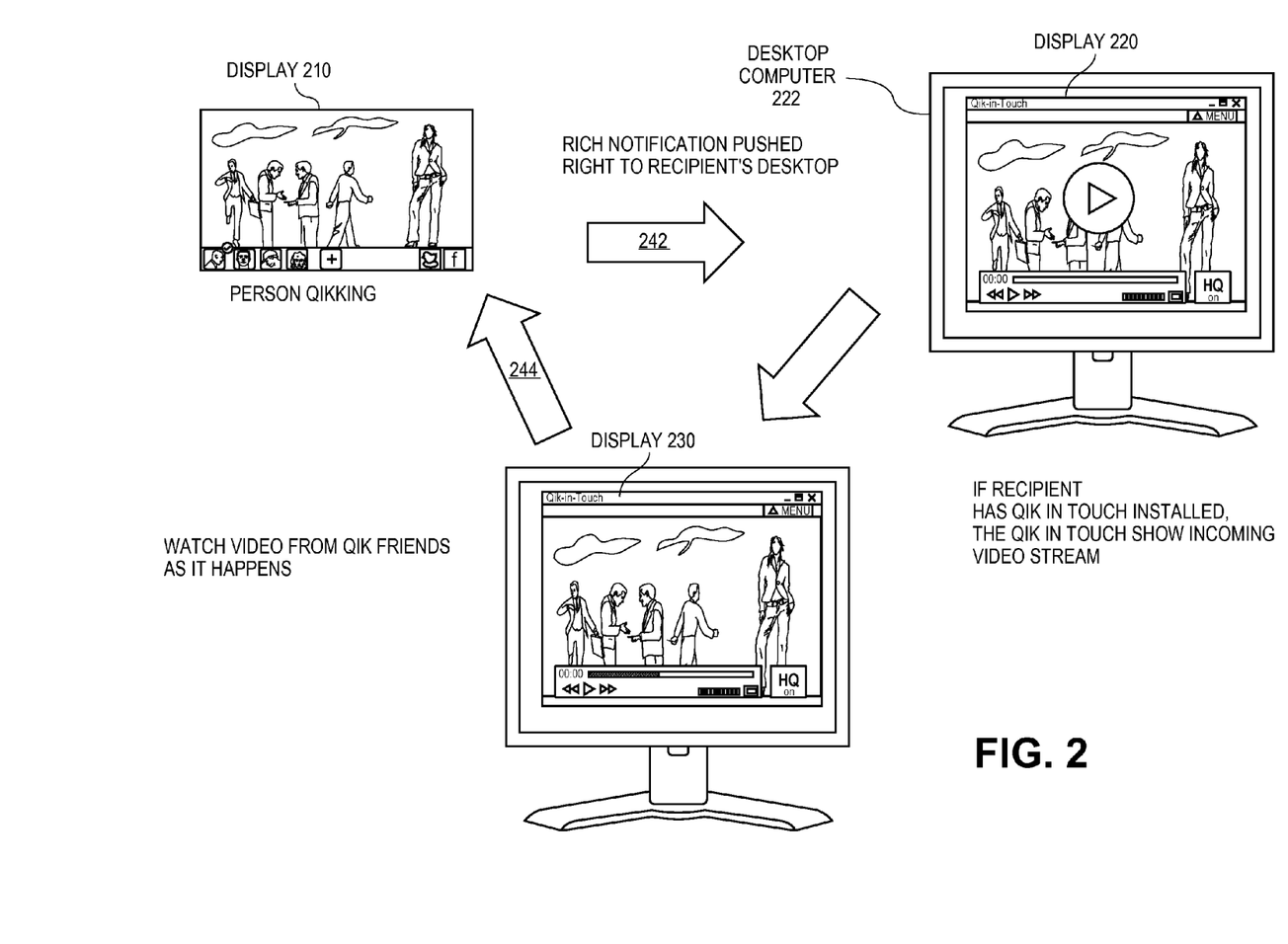
FIG. 2 is a diagram that depicts the display of a mobile device and the display of a desktop computer, according to an embodiment of the invention.

FIG. 2 is a diagram that depicts the display 210 of mobile device 110 and the display 220 of a desktop computer 222, according to an embodiment of the invention. Mobile device 110 executes a sending application that establishes a connection with Push Notification Server 150. Mobile device 110 sends a live video stream over this connection. The live video stream is depicted as data flow 242.

The desktop computer executes a receiving application (e.g., Qik-in-Touch™) that is configured to communicate with, and receive real-time video notifications from, Push Notification Server 150. In response to receiving a live stream notification from Push Notification Server 150, the receiving application causes a graphical user interface (GUI) to be displayed on display 220. In this example, the real-time video notification that is displayed via the GUI includes an image from the live video stream transmitted from mobile device 110.

FIG. 2 also depicts display 230, which is a different instance of display 220. Display 230 indicates that a portion of the live video stream has been displayed, as indicated by the progress bar in the GUI depicted in display 230.

In an embodiment, as indicated by data flow 244, response data may be sent from the receiving application executing on the consuming device to the producing device (i.e., mobile device 110 in this example). For example, the user of the desktop computer can enter input into the receiving application, which causes the receiving application to send response data to mobile device 110. Such response data may indicate the identity of the consuming user. Thus, a user of mobile device 110 may view all the users who are viewing the live video stream produced by mobile device 110. Also, a communication channel may be established between desktop computer 222 and mobile device 110 so that a consuming user may talk with the user of mobile device 110 while the live video stream is being transmitted.

Example Graphical User Interface

Figure 3:
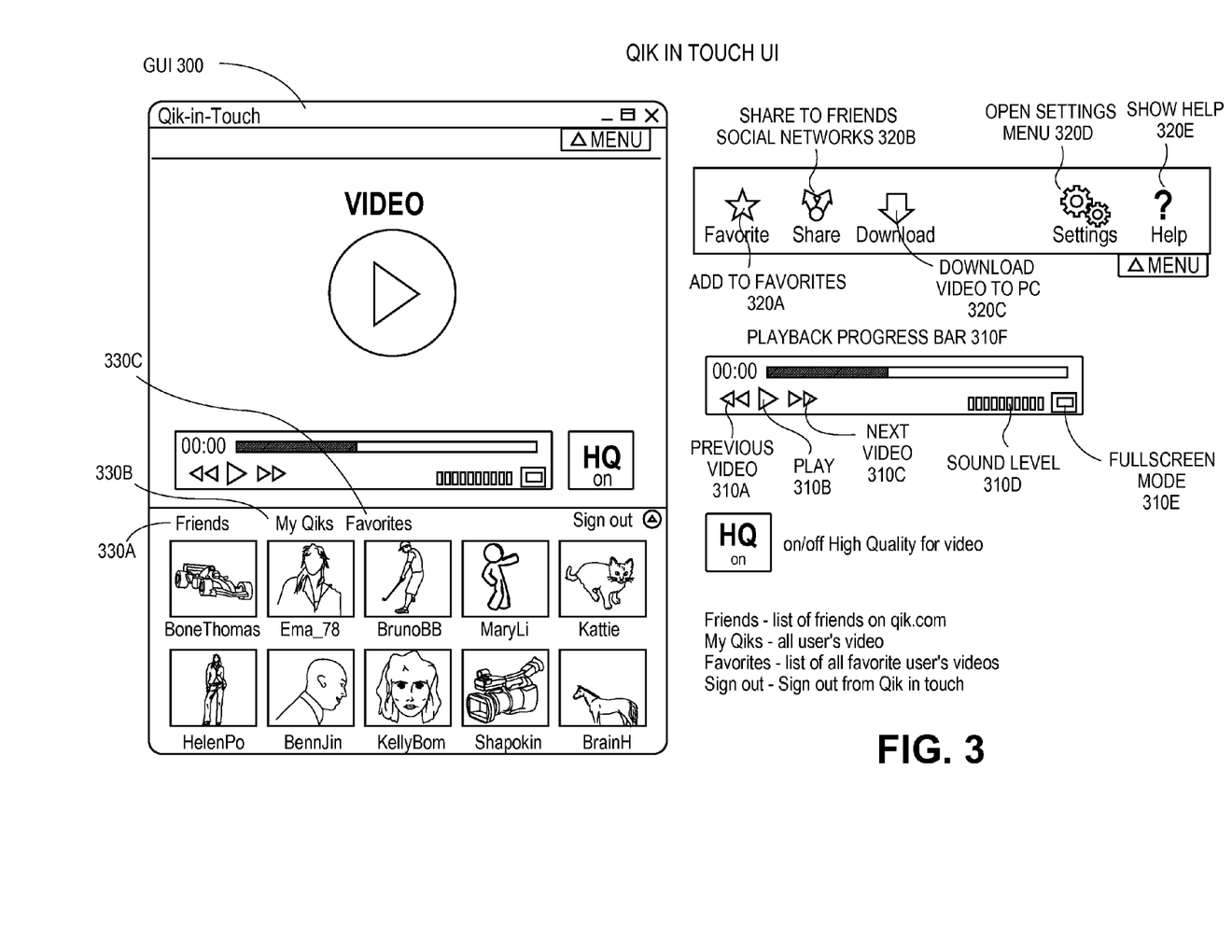
FIG. 3 is a diagram that depicts an example graphical user interface that is generated by example video consumption client software executing on a PC, according to an embodiment of the invention.

FIG. 3 is a diagram that depicts an example GUI 300 that is displayed on display 220, according to an embodiment of the invention. Qik-in-Touch™ is an example of a software application that, when executed, causes GUI 300 to be generated. GUI 300 comprises video stream play controls 310A-F, menu options 320A-E, and tabs 330A-C. Video stream play controls 310A-F comprise a previous video button 310A, a play video button 310B, a next video play button 310C, a sound control 310D, a view mode 310E, and a progress bar 310F.

Menu options 320A-E comprises an add-to-favorites button 320A, a share button 320B, a download button 320C, an open settings menu button 320D, and a help button 320E. Selection of add-to-favorites button 320A causes a video stream to be added to a list of video streams that the user considers his/her favorite video streams. The "favorite" video streams may be viewed by selection of favorites tab 330C described below. Selection of share button 320B causes (or at least enables) a video stream to be sent to a set of designated friends, to a social networking account (e.g., Facebook™), and/or to a video sharing site (e.g., YouTube™). Selection of download button 320C causes a video stream to be downloaded to and permanently stored on a PC.

Tabs 330A-C comprise a friends tab 330A, a My Qik's tab 330B, and a favorites tab 330C. Selection of friends tab 330A causes an identifier (and, optionally, an image) for each registered friend of the user of the desktop computer to be displayed. Selection of My Qik's tab 330B causes identifiers for the entire user's subscribed for video streams to be displayed. Selection of favorites tab 330C causes a list of the user's videos that the user has designated as his/her favorites to be displayed.

Push Notification Server Architecture

Figure 4:
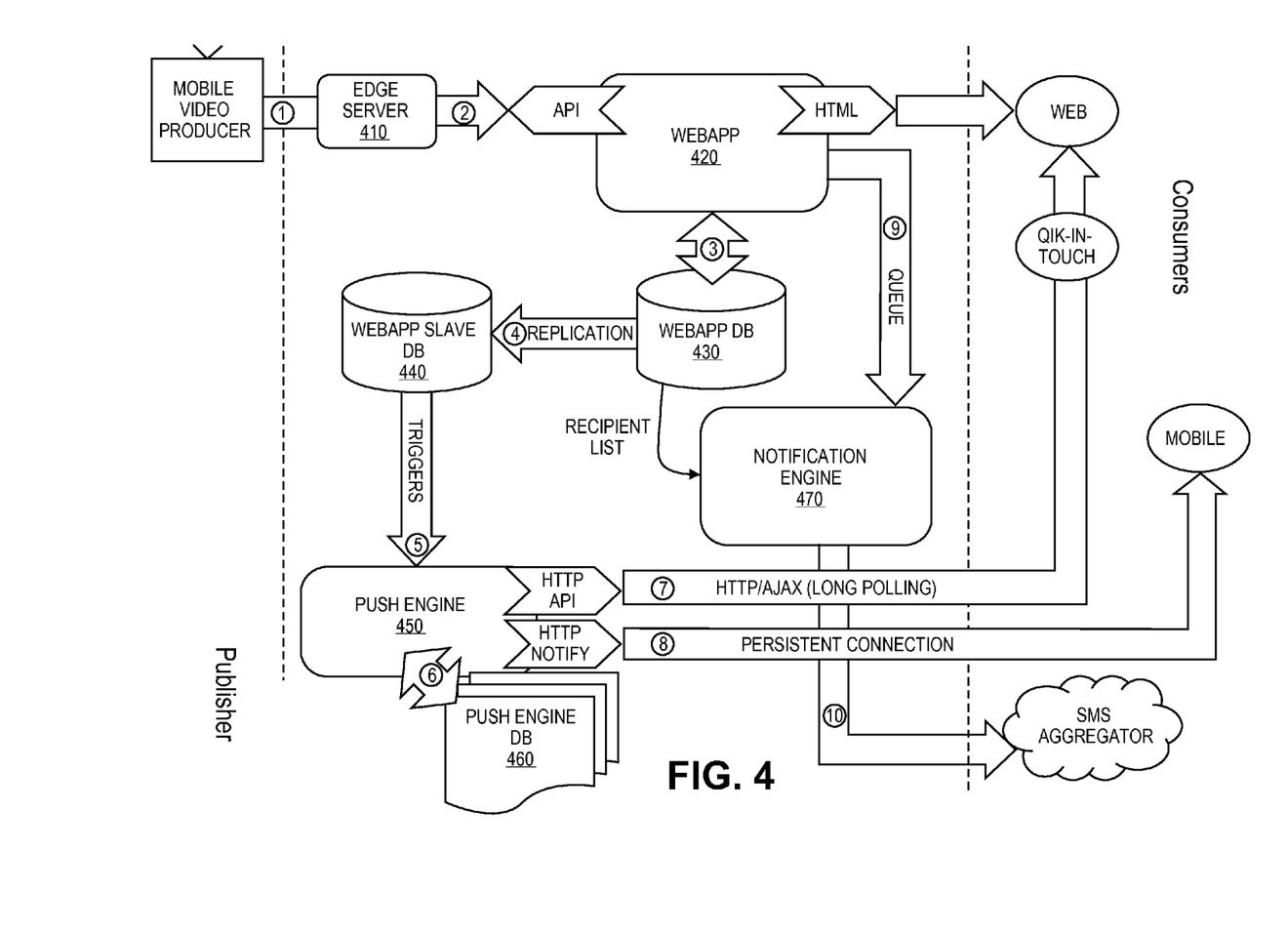
FIG. 4 is a block diagram that illustrates elements of a push notification architecture; according to an embodiment of the invention.

FIG. 4 is a block diagram that depicts various elements of a Push Notification Architecture 400, according to an embodiment of the invention. Each element depicted as part of Push Notification Architecture 400 may be implemented in hardware, software, or any combination of hardware and software. Architecture 400 comprises an Edge Server 410, a WebApp 420, a WebApp DB 430, a WebApp Slave DB 440, a Push Engine 450, a Push Engine DB 460, and a Notification Engine 470.

A client 402 connects (1) to Edge Server 410 which provides a uniform communication layer for mobile devices. Client 402 sends, to Edge Server 410, a "start stream" command with initial metadata for that stream, wherein the metadata indicates, for example, a level of privacy, a live/upload flag. Edge Server 410 contacts (2) WebApp 420 with information provided by client 402. In response, WebApp 420 creates (3) a stream entry with the metadata in WebApp DB 430. This new record is replicated (4) to WebApp Slave DB 440, which triggers (5) actions that push row-level change (insert/delete/update operation) into an incoming event queue of Push Engine 450. This new event is published both to Push Engine 450 and to Notification Engine 470. Push Engine 450 processes the new event that is stored (6) in Push Engine DB 460, distributed between instances and delivered (7,8) to consuming devices. WebApp 420 might also push (9) information about the new video stream into a queue of Notification Engine 470. Notification Engine 470 selects the event and sends (10) a notification via SMS, e-mail, and/or other notification external channel, which are non-real-time.

Push Engine 450 is configured to send real-time video notifications of live video streams to multiple types of endpoints, including (as indicated previously) a web-based application executing on a device and a client-based application executing on a PC, a mobile device, a tablet computer, and a television.

Edge server 410 receives a message from mobile device 110 that mobile device 110 is capturing a live stream that will be or is being transmitted. Edge server 410 communicates the message to WebApp 420. WebApp 420 creates a live stream event based on the message and stores the live stream event into WebApp DB 430. The live stream event may be stored as a row in a table stored in WebApp DB 430, where the row indicates the source of the live stream (which source is mobile device 110 in this example).

Sequence Diagram

Figure 5:
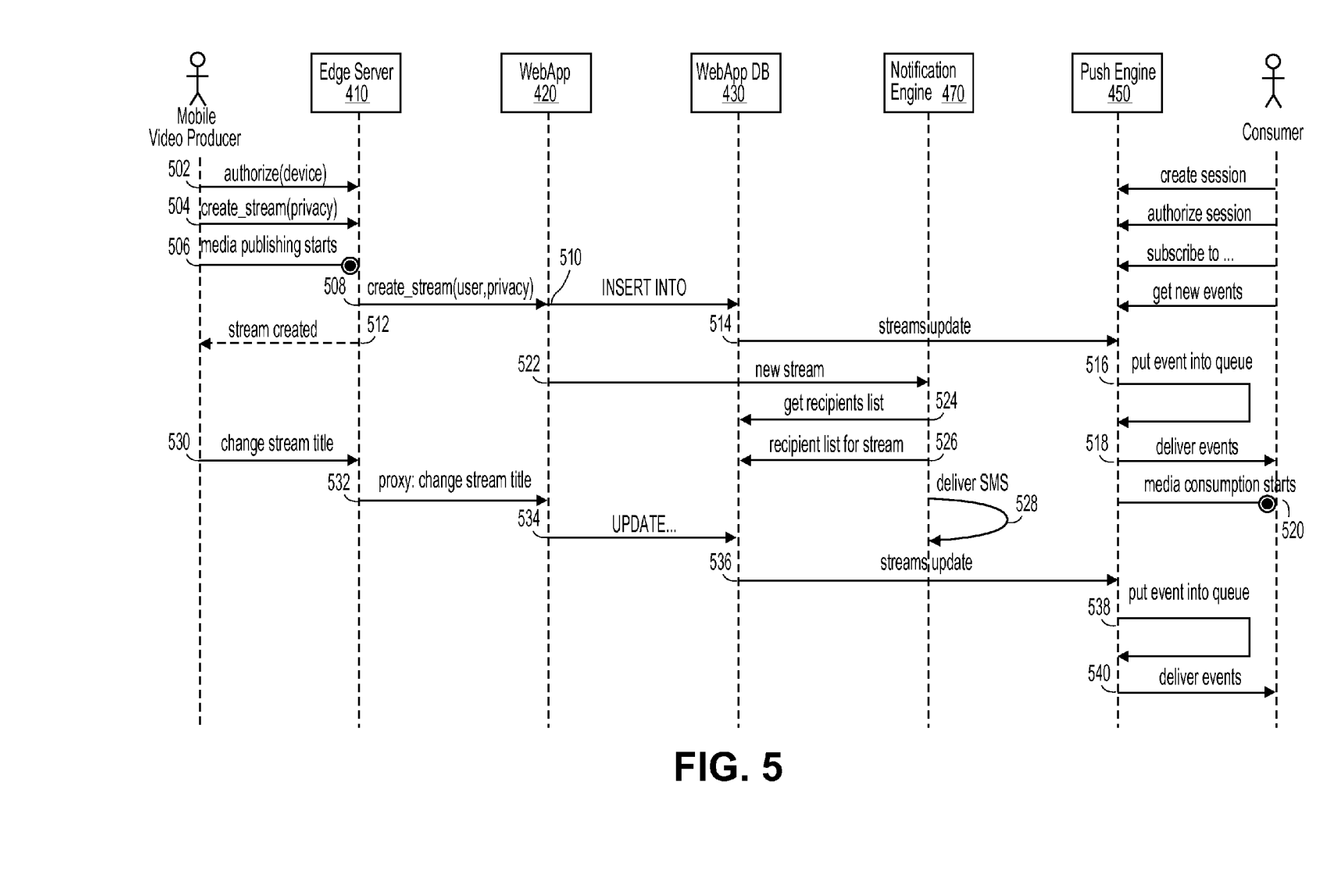
FIG. 5 is a sequence diagram that depicts a sequence of steps that are performed by different elements in FIG. 1 and FIG. 4, according to an embodiment of the invention.

FIG. 5 is a sequence diagram that depicts a sequence of steps that are performed by different elements in FIG. 1 and FIG. 4, according to an embodiment of the invention.

In step 502, mobile device 110 connects to Edge Server 410, which provides a uniform communication layer for mobile devices.

In step 504, mobile device 110 sends a create stream command to Edge Server 410. This command may include initial metadata for the video stream, such as level of privacy and a live/upload flag.

In step 506, mobile device 110 begins to publish a live video stream produced by mobile device 110.

In step 508, in response to the create stream command, Edge Server 410 sends, to WebApp 420, a create stream command with information provided by mobile device 110, such a level of privacy and an identity of the producing user.

In step 510, WebApp 420 creates a record based on the create stream command sent from Edge Server 410 and causes the record to be inserted into WebApp DB 430. The record includes metadata about the video stream.

Meanwhile, in step 512, Edge Server 510 sends an acknowledgement to mobile device 110 that a stream has been created.

In step 514, this new record is replicated to WebApp Slave DB 440, which triggers actions that push a row-level change event (e.g., corresponding to an insert/delete/update operation) to Push Engine 450, which, in turn, puts a new stream event into an incoming event queue (step 516). This new stream event may be broadcasted to all instances of the Push Engine 450. Eventually, in step 518, Push Engine 450 sends, to a consuming device that subscribed for live video streams from the producing device, a real-time notification that is based on the new stream event.

In step 520, the consuming device begins to receive the live video stream.

In step 522, WebApp 420 sends a new stream message to Notification Engine 470. The new stream message includes identification data that indicates mobile device 110 or an identity of the user of mobile device 110.

In step 524, Notification Engine 470 retrieves a recipient list from WebApp DB 430 based on the identification data in the new stream message of step 512. Each recipient identified in the recipient list has indicated that he/she would like to view (or follow) videos produced by the producing user. For each such user, notification settings are identified and, if the follower is subscribed to notifications about new streams (step 526) (and has a phone number associated with an account with the operator of Push Notification Server 150), then Notification Engine 470 sends (in step 528) an SMS message, email, or other message via another "external" notification channel (i.e., not via Push Engine 450). For example, an SMS message might include the following text and link, "John is streaming right now. http://qik.com/video/ . . . " If the consuming user selects the link, then the video stream is sent to the consuming user's device.

This process that employs Notification Engine 470 may be used in the case where the subscriber does not have a connection to Push Engine 450. For example, the subscriber may be offline. Also, a subscriber that does not have software executing on his/her mobile phone that allows the mobile phone to connect to Push Engine 450 can only receive such an external notification, e.g., through SMS or email.

In step 530, the user of mobile device 110 changes the title of the live video stream, which causes mobile device 110 to send a change stream title message to Edge Server 410.

In step 532, in response, Edge Server 410 sends a change stream title command to WebApp 420.

In step 534, WebApp 420 creates an update record based on the change stream title command sent from Edge Server 410 and causes the update record to be stored in WebApp DB 430.

In step 536, WebApp DB 430 sends a stream update message to Push Engine 450, which, in turns, puts a stream update event into an event queue (step 538). Eventually, in step 540, Push Engine 450 sends, to the consuming device, a notification that is based on the stream update event.

Views

A "view" is a set of objects that conform to certain criteria. One or more clients (i.e., consuming devices) subscribe to a view. Updates to a view are pushed immediately to any clients subscribed to that view. An example of a view is a live video stream produced by a particular user. When the particular user initiates streaming of live video, the corresponding view is changed and information about the new live video stream is pushed to all subscribed clients to that view. A view may be initially filled with some contents. For a particular producing user's videos view, the initial contents may be the last videos produced by the producing user. Any change to items currently visible in the view may be pushed to the subscribing clients. Thus, no changes to items that are not currently visible in a view are pushed to clients of that view. The contents of a view contents are changed immediately if it's not legitimate for the item to be part of the view. For example, when producing device makes its video private, it's immediately deleted from all views displaying public videos.

Sessions

In an embodiment, a session is created for subscribing to live video stream changes. A new session may be created on the first subscription request from a potential consuming device. A session is state that is preserved between HTTP requests. A session may be authorized under any user to enable access to data private for the user. \

A session is used to subscribe to a view. A view may be created on a subscribing client's request; otherwise, an existing view is used. Subsequently, a session (corresponding to a subscriber) is connected to the view. Any initial contents of the view may transmitted to the subscribing client as result of a subscription request. Any subsequent changes to the view are transmitted back to the client through the session. A session may be used to subscribe to many views simultaneously.

To fetch events (i.e., changes to a view) from session, a client issues special HTTP requests specifying desired maximum timeout, for example, 60 seconds. If there are some events queued for the session, then a push server sends those events immediately to the corresponding client and the HTTP request is finished. Otherwise, the HTTP request will be finished when the timeout elapses. A client issues a request to fetch events once again after a previous HTTP request times out. This technique is commonly referred as "HTTP long polling." Together with HTTP keep-alive support and other queries going from client to server, it may be sufficient to have two TCP connections to push servers: one TCP connection to do long polling and the other TCP connection to issue other requests (e.g., view subscription/unsubscription). These HTTP requests are completely compatible with any HTTP client and degrade gracefully in case of limited HTTP support (for example, no keep-alives).

In response to receiving a view subscription request, a view may be created inside one of the push server instances. The view will be running in the push server instances while there is at least one subscriber to the view. As indicated above, multiple subscribers may connect to the same view. Creating several views for one client may result in views that are created in different push server instances. However, due to a distributed design, events are correctly pushed to subscribing clients. Views consume object change events (originating from database changes), filter those events, change view contents and distribute change events to all subscribers (sessions). Session events are stored in a push server instance. A client that requests events may contact any push server instance, which performs a local fetch from a queue or performs a remote fetch by sending a request to another push server instance. An AMQP server is used as common bus for event distribution: an object change event is broadcasted to all push server instances, consumed by the appropriate views, processed, and distributed to session queues.

The view concept allows to achieve three goals:

1. If many consuming devices are subscribed to the same producing device, then those consuming devices are subscribed to the same view at the server side and server resources are used efficiently, as there is only one instance of the view.

2. At the same time, each consuming device may subscribe to a personal video timeline that includes videos from the consuming device's friends and/or followers. In this case, views make it possible for each consuming user to consume a unique video stream. Also, views may filter videos in that only events about videos available to a particular consuming device are delivered to that particular consuming device. For example, when users A and B are watching user C's video timeline, users A and B may see a different event stream. User C may cause a private video stream to be shared with A so that user A is able to see that video stream (and events about it), but user B is not able to see that video stream.

3. Views may be populated upon subscription with initial contents (for example, last ten videos by that producing user). Therefore, if a subscribing client catches up with a video timeline after streaming has already started, then it is possible for the subscribing client to receive consistent initial data and all the events associated with the video timeline delivered afterwards.

Figure 6:
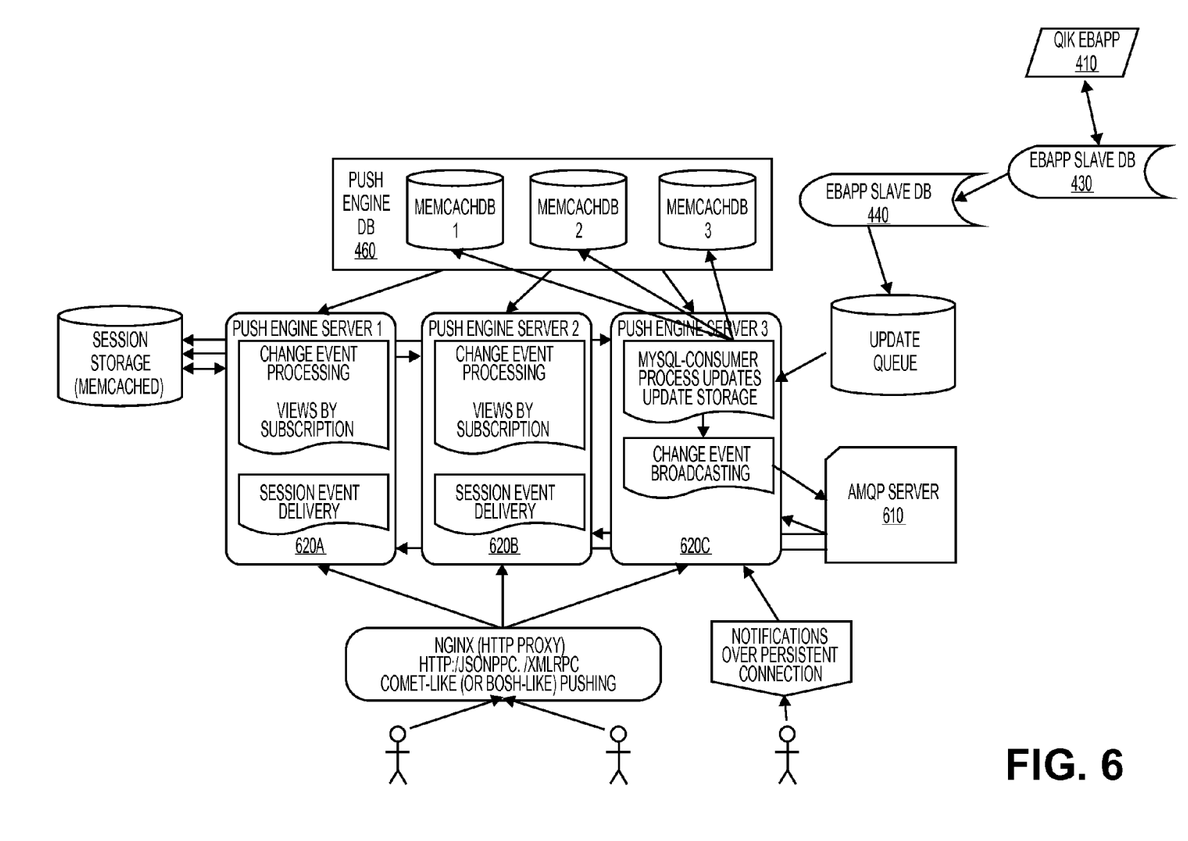
FIG. 6 is a block diagram that depicts a push engine architecture, according to an embodiment of the invention.

FIG. 6 is a block diagram that depicts how real-time video notifications may be sent to three types of clients, according to an embodiment of the invention. The three types of clients are web-based clients, clients running specially-configured software (e.g., Qik-in-Touch™), and mobile devices that are not running such software.

Updates to WebApp Slave DB 440 may result in a single notification inside Push Engine 450. Each new stream results in one event published by the AMQP server 610. Each Push Engine server instance 620A-C listens for events on AMQP server 610, processes an event, and transforms the event into a real-time notification to be sent to a subset of the consuming devices. If an event (i.e., corresponding to a live video stream) is of interest to a user community, then a Push Engine server instance 620 publishes the event to a queue for the users in that community. Subscribing clients may connect via HTTP API or a persistent connection protocol.

Such a design scales out by adding more server instances of Push Engine 450 to the cluster, which processes the "interest" for a subset of the user base. A single event in Push Engine 450 could result in several thousands of out-going streams without causing any delay in sending the event out to interested consuming devices.

Figure 7:
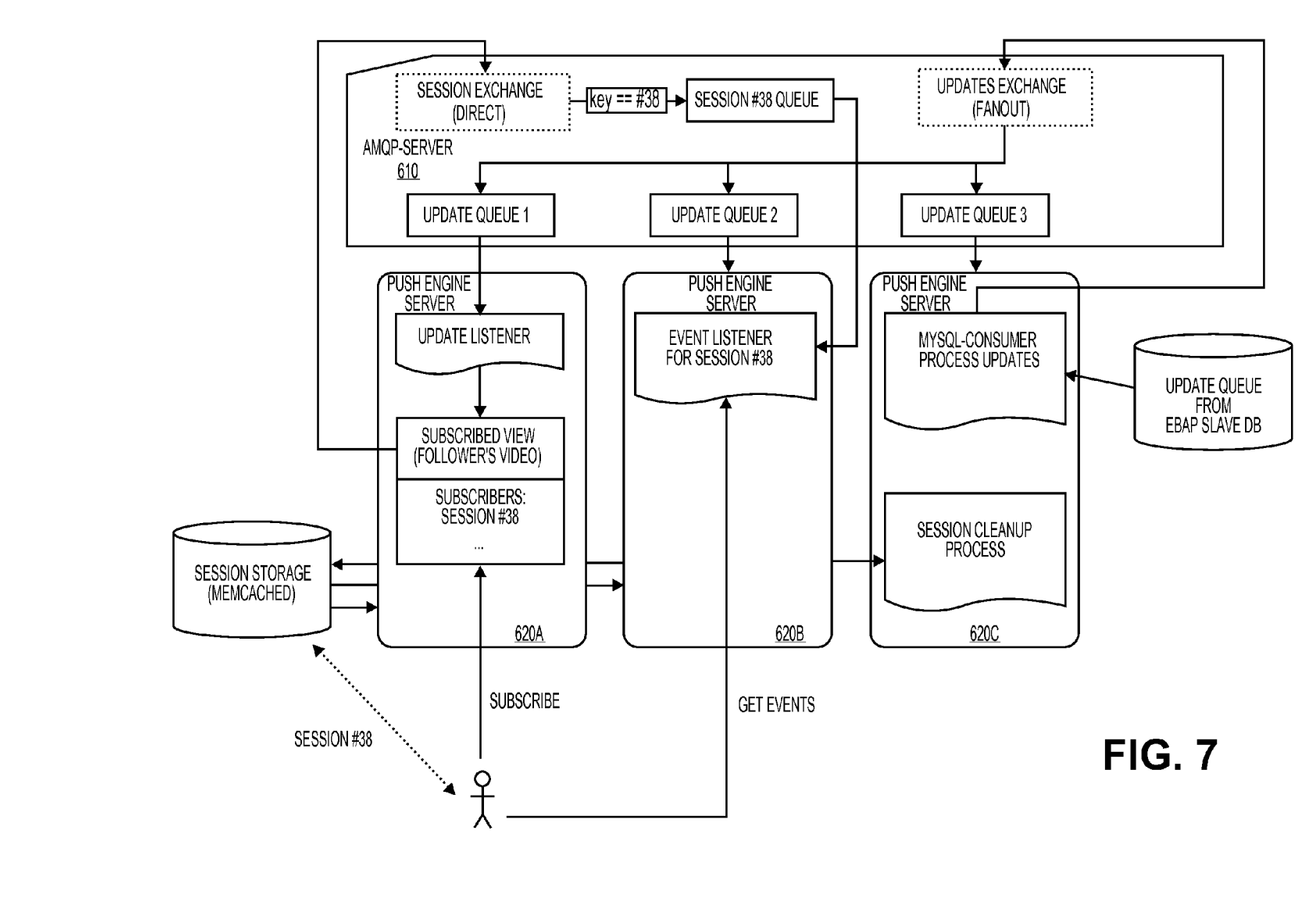
FIG. 7 is a block diagram that depicts a client receiving a real-time video notification, according to an embodiment of the invention.

FIG. 7 is a block diagram that depicts a client receiving a real-time video notification, according to an embodiment of the invention. Session #38 identifies the subscription request for video streams produced by an unique user. Session #38 maps to a precise destination of a live video stream: a subscriber ID, which is #38 in this case. A Push Engine server instance 620 listens to all events being published by AMQP server 610 and processes the events individually. In this example, Push Engine server instance 620B processes the event and pushes the event to a queue for Subscriber #38. Later, subscriber #38 can come to any Push Engine server instance 620 and "pick up" the event. Such a design ensures that any Push Engine server instance 620 can deliver the event.

Awareness

In an embodiment, neither the user of mobile device 110 nor mobile device 110 itself is required to know or have information about any of devices 160A-N of a live video stream that mobile device 110 transmits. Thus, mobile device 110 is not required to send any information (a) that identifies a consuming device, (b) that identifies the type of the consuming device, or (c) that identifies a consuming user. Mobile device 110 is said to be "unaware" of consuming devices of the live video stream.

Hardware Overview

Figure 8:
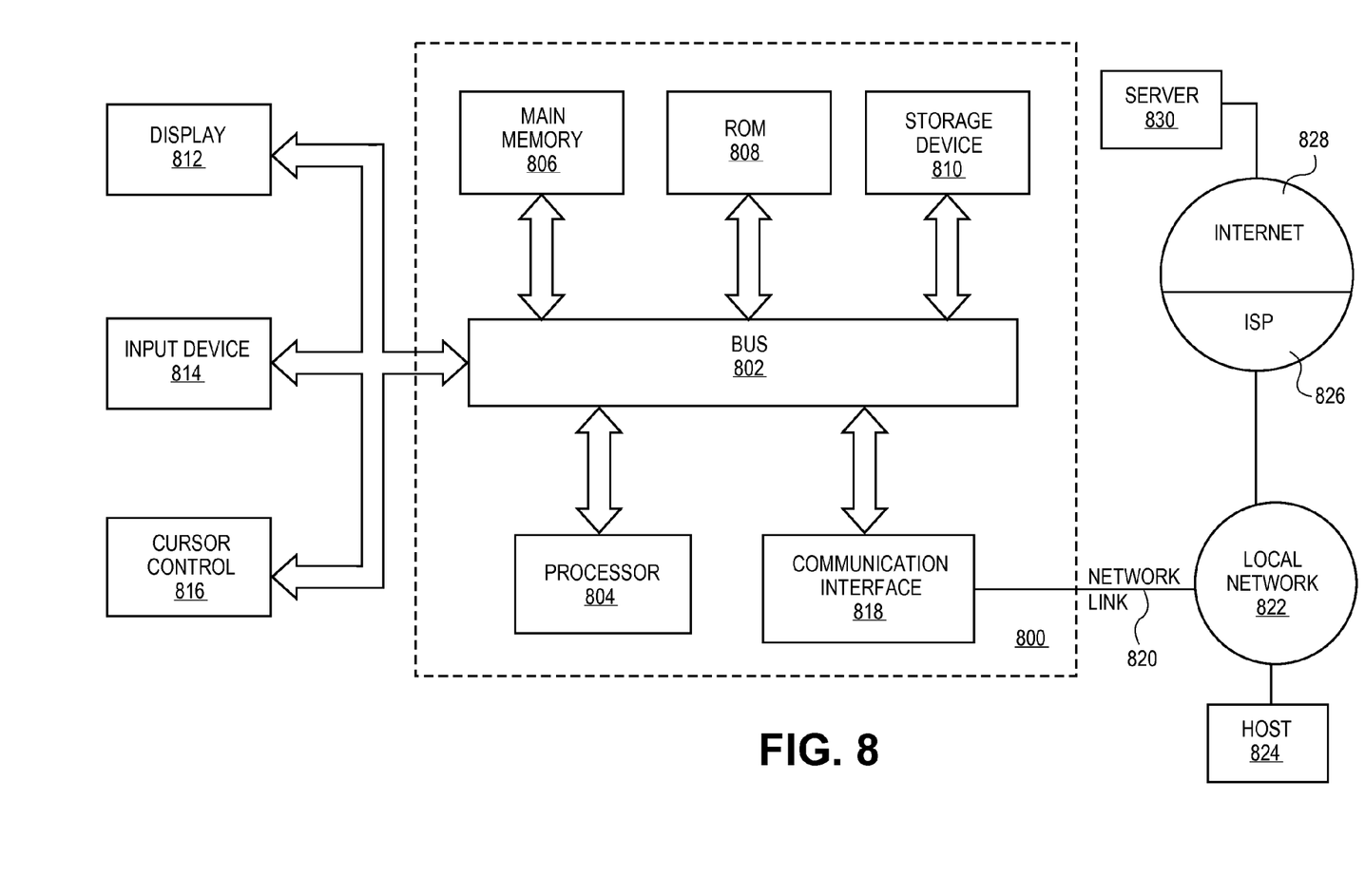
FIG. 8 is a block diagram that depicts a computer system upon which an embodiment of the invention may be implemented.

FIG. 8 is a block diagram that depicts a computer system 800 upon which an embodiment of the invention may be implemented. For example, mobile device 110 and Push Notification Server 150 may be implemented upon computer system 800. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising:
receiving a live video stream in real-time while the live video stream is being captured from a device that captured the live video stream; and
in response to receiving the live video stream and in real-time while receiving the live video stream:
creating a record that indicates that a new stream is created and is associated with a device that captured the live video stream, and storing the record in a database;
identifying a plurality of other devices based on the other devices being associated with users that subscribe to content from at least one of the device that captured the live video stream, or a producing user associated with the device that captured the live video stream;
sending, to the plurality of other devices, notification data that indicates data about the live video stream;
sending the live video stream to at least a subset of the plurality of other devices;
receiving response data from a particular device in the subset; and
in response to receiving the response data, sending the response data to the device that captured the live video stream, the response data being at least one of identification data that identifies a user of the particular device or audio data initiated by the user of the particular device.

2. The method of claim 1, wherein the device is a mobile device that creates the live video stream based on video data generated by a video capturing component of the mobile device.

3. The method of claim 1, wherein:
the subset of the other devices includes a first device and a second device that is different than the first device;
the first device is accessible via a first network that requires a first communication protocol;
the second device is accessible via a second network that requires a second communication protocol that is different than the first communication protocol.

4. The method of claim 1, wherein:
the subset of the other devices includes a first device and a second device that is different than the first device;
the first device is one of a mobile device, a laptop or desktop computer, or a television;
the second device is another one of the mobile device, the laptop or desktop computer, or the television.

5. The method of claim 4, wherein:
the live video stream is encoded in a particular format;
the method further comprising, prior to sending the live video stream to the subset of the plurality of other devices, transcoding data from the live video stream into a plurality of formats, each of which is different than the particular format, wherein the plurality of formats include a first format and a second format; and
sending the live video stream to the subset of other devices includes:
sending, to a first device of the subset of other devices, a first version of the live video stream, wherein the first version of the live video stream is encoded in the first format, and
sending, to a second device of the subset of other devices, a second version of the live video stream, wherein the second version of the live video stream is encoded in the second format.

6. The method of claim 1, wherein identifying a plurality of other devices comprises:
identifying a set of criteria associated with each device of multiple devices that includes the plurality of other devices and additional devices; and
comparing the set of criteria associated with said each device of the multiple devices with data about the video stream to identify the plurality of devices.

7. The method of claim 1, wherein the plurality of other devices are identified based on data that is received from the plurality of other devices, wherein no data from the device identifies any of the plurality of other devices.

8. The method of claim 1, further comprising, prior to sending the live video stream to the subset of the plurality of other devices:
receiving, from each device of the subset, confirmation data that indicates that the user of said each device desires to receive the live video stream;
wherein sending the live video stream comprises sending the live video stream to only those devices of the plurality of devices from which the confirmation data is received.

9. A system comprising:
one or more processors; and
one or more machine-readable storage devices storing computer-executable instructions that are executable by the one or more processors to cause the system to perform operations including:
receiving a live video stream in real-time during capture of at least a portion of the live video stream;
creating a record that indicates that a new stream is created and is associated with a device that captured the live video stream, and storing the record in a database;
identifying, while receiving at least a portion of the live video stream, one or more devices configured to consume the live video stream;

sending a notification of the live video stream for receipt by the one or more devices, the notification providing options for a user to view the live video stream in real-time, to ignore the live video stream, or to view the live video stream at a later time;

in response to receiving a reply to the notification, transmitting at least a portion of the live video stream for receipt by the one or more devices;

receiving response data from a particular device of the one or more devices; and in response to receiving the response data, sending the response data to the device that captured the live video stream, the response data being at least one of identification data that identifies a user of the particular device or audio data initiated by the user of the particular device.

10. The system of claim 9, wherein the device that captured the live video stream is a mobile device that creates the live video stream based on video data generated by a video capturing component of the mobile device.

11. The system of claim 9, wherein the live video stream is encoded in a particular format, and wherein the operations further include:

transcoding the at least a portion of the live video stream into a different format to generate a transcoded version of the at least a portion of the live video stream; and sending the transcoded version of the at least a portion of the live video stream to at least one of the one or more devices.

12. The system of claim 9, wherein said identifying comprises:

identifying a set of criteria associated with each device of multiple devices that includes the one or more devices and at least one additional device; and comparing the set of criteria associated with said each device of the multiple devices with data about the video stream to identify the one or more devices.

13. The system of claim 9, wherein said identifying comprises determining that the one or more devices have subscribed to receive live video streams from a user associated with the device that captured the live video stream.

14. The system of claim 9, wherein the reply to the notification comprises confirmation data that indicates that one or more users of the one or more devices provided input requesting to receive the live video stream.

15. A device configured to perform operations comprising:

receiving a live video stream in real-time during capture of at least a portion of the live video stream;

creating a record that indicates that a new stream is created and is associated with a device that captured the live video stream, and storing the record in a database;

identifying, while receiving at least a portion of the live video stream, one or more devices that subscribe to at least one of a user that produces the live video stream or a device that produces the live video stream;

sending a notification of the live video stream for receipt by the one or more devices;

in response to receiving a reply to the notification, transmitting at least a portion of the live video stream for receipt by the one or more devices;

receiving response data from a particular device of the one or more devices; and in response to receiving the response data, sending the response data to the device that captured the live video stream, the response data being at least one of identification data that identifies a user of the particular device or audio data initiated by the user of the particular device.

16. The device of claim 15, wherein the device that captured the live video stream is a mobile device that creates the live video stream based on video data generated by a video capturing component of the mobile device.

17. The device of claim 15, wherein the live video stream is encoded in a particular format, and wherein the operations further include:

transcoding the at least a portion of the live video stream into a different format to generate a transcoded version of the at least a portion of the live video stream; and sending the transcoded version of the at least a portion of the live video stream to at least one of the one or more devices.

18. The device of claim 15, wherein said identifying comprises:

identifying a set of criteria associated with each device of multiple devices that includes the one or more devices and at least one additional device; and comparing the set of criteria associated with said each device of the multiple devices with data about the video stream to identify the one or more devices.

19. The device of claim 15, wherein said identifying comprises determining that the one or more devices have subscribed to receive live video streams from a user associated with the device that captured the live video stream.

20. The device of claim 15, wherein the reply to the notification comprises confirmation data that indicates that one or more users of the one or more devices provided input requesting to receive the live video stream.

* * * * *